United States Patent
Mahdjoubi Namin

(10) Patent No.: US 9,956,512 B2
(45) Date of Patent: May 1, 2018

(54) DEVICE AND METHOD FOR PURIFYING AND RECYCLING SHOWER WATER

(71) Applicant: ORBITAL SYSTEMS AB, Limhamn (SE)

(72) Inventor: Amir Mehrdad Mahdjoubi Namin, Limhamn (SE)

(73) Assignee: Orbital Systems AB, Limhamn (SE)

(*) Notice: Subject to any disclaimer, the term of this patent is extended or adjusted under 35 U.S.C. 154(b) by 704 days.

(21) Appl. No.: 14/367,772

(22) PCT Filed: Dec. 19, 2012

(86) PCT No.: PCT/SE2012/051430
§ 371 (c)(1),
(2) Date: Jun. 20, 2014

(87) PCT Pub. No.: WO2013/095278
PCT Pub. Date: Jun. 27, 2013

(65) Prior Publication Data
US 2015/0344323 A1    Dec. 3, 2015

(30) Foreign Application Priority Data
Dec. 23, 2011    (SE) ...................................... 1151272

(51) Int. Cl.
*A47K 3/28*    (2006.01)
*B01D 39/20*    (2006.01)
(Continued)

(52) U.S. Cl.
CPC .......... *B01D 39/2082* (2013.01); *A47K 3/281* (2013.01); *C02F 1/003* (2013.01);
(Continued)

(58) Field of Classification Search
CPC ................ A47K 3/281; B01D 39/2082; B01D 2239/025; C02F 1/003; C02F 1/008;
(Continued)

(56) References Cited

U.S. PATENT DOCUMENTS 5,234,583 A    8/1993    Cluff
5,353,448 A *  10/1994   Lee ........................... E03C 1/06
                                                    4/567
(Continued)

FOREIGN PATENT DOCUMENTS

JP    08-019773 A    1/1996
JP    2007-325983 A    12/2007
(Continued)

OTHER PUBLICATIONS

English Translation of Japanese Application No. JP 08-19773A.
(Continued)

*Primary Examiner* — Lucas Stelling
(74) *Attorney, Agent, or Firm* — Moser Taboado

(57) ABSTRACT

The present invention describes a hybrid device (1) for a recirculation shower, allowing purification and either recycling of water or discarding of water, wherein said hybrid device (1) comprises a recirculation loop (2), a filter system (4) with a nano-filter (5) such as for instance an electropositive nano-ceramic filter, e.g. a nano alumina (fiber) filter, at least one filter quality sensor (3), at least one pre-filter (6), and wherein the hybrid device (1) is arranged to redirect the water from recirculation to drainage when the at least one filter quality sensor (3) indicates the need thereof.

13 Claims, 2 Drawing Sheets

(51) Int. Cl.
  *C02F 1/44* (2006.01)
  *E03B 1/04* (2006.01)
  *C03C 1/04* (2006.01)
  *E03C 1/00* (2006.01)
  *E03C 1/04* (2006.01)
  *C02F 1/00* (2006.01)
  *C02F 103/00* (2006.01)

(52) U.S. Cl.
  CPC ............... *C02F 1/008* (2013.01); *C02F 1/442* (2013.01); *E03B 1/042* (2013.01); *E03C 1/00* (2013.01); *E03C 1/0408* (2013.01); *B01D 2239/025* (2013.01); *C02F 2103/002* (2013.01); *C02F 2209/05* (2013.01); *C02F 2209/40* (2013.01); *C02F 2209/42* (2013.01); *C02F 2301/046* (2013.01); *C02F 2307/06* (2013.01); *E03B 2001/045* (2013.01); *E03C 2201/40* (2013.01); *Y02A 20/148* (2018.01); *Y02A 20/304* (2018.01)

(58) Field of Classification Search
  CPC .......... C02F 1/442; C02F 2103/002; C02F 2209/05; C02F 2209/40; C02F 2209/42; C02F 2301/046; C02F 2307/06; E03B 1/042; E03B 2001/045; E03C 1/00; E03C 1/0408; E03C 2201/40; Y02A 20/148; Y02A 20/304
  See application file for complete search history.

(56) References Cited

U.S. PATENT DOCUMENTS

| | | | |
|---|---|---|---|
| 7,390,343 | B2 | 6/2008 | Tepper et al. |
| 2003/0062300 | A1* | 4/2003 | Okano ................. B01D 29/603 210/443 |
| 2010/0237021 | A1 | 9/2010 | Guttau et al. |
| 2011/0036760 | A1* | 2/2011 | Retolaza Gavina .... C02F 3/006 210/85 |
| 2011/0146800 | A1 | 6/2011 | Jallon et al. |
| 2011/0225722 | A1 | 9/2011 | Valdenaire |

FOREIGN PATENT DOCUMENTS

SE      469413 B       7/1993
WO   WO 2004101902 A1  11/2004

OTHER PUBLICATIONS

English Translation of Japanese Application No. JP 2007-325983.
Dffice-Action-JP-Application_No_2014-548736_Aug. 23, 2016_B0014P0613.
Translation_Office-Action-JP-Application_No_2014-548736_Aug. 23, 2016_B0014P0613.
European Application No. EP 12860968, Supplementary European Search Report.

* cited by examiner

DEVICE AND METHOD FOR PURIFYING AND RECYCLING SHOWER WATER

CROSS REFERENCE TO RELATED APPLICATIONS

This application is the U.S. national phase of International Application No. PCT/SE2012/051430 filed Dec. 19, 2012, which designated the U.S. and claims priority to Swedish Application No. 1151272-0 filed Dec. 23, 2011, the entire contents of each of which are hereby incorporated by reference.

FIELD OF THE INVENTION

The present invention relates to a shower concept that involves optional and optimized recirculation of water combined with verified purification, thereby providing an economically and environmentally competitive alternative.

TECHNICAL BACKGROUND

It is known to both recycle and filter water in shower systems. For example in US2011225722 there is disclosed a device for distribution of shower water in a closed circuit. The device includes an element for closing the outlet for draining the shower pan and an intake element including an intake pump able to draw in water from the shower pan, filter it and feed it back, via the water redistribution element to the element suitable for spraying the water. Further, SE469413 describes a shower comprising at least one nozzle through which a fluid flows in a shower cabin. The shower shows a collection container for said fluid, and a nozzle and said container are part of a circulation circuit comprising a pump, aiding said fluid in said container to circulate through said nozzle. The shower also shows means to discard said fluid. In US 20110146800 a water recycling apparatus and fluid contamination detection system is disclosed. This system comprises optical means for detecting contaminants, a filter for purification and may also include a disinfection unit. Furthermore, in US20100237021 a recirculation shower for aircrafts or other transportations is disclosed. This device comprises backwash lines. A first backwash line, designed to convey backwash water to the filtration unit and a second backwash line designed to discharge backwash water from the filtration unit. The purpose of the arrangement is to minimize the use of freshwater.

There are several drawbacks to the methods and devices described in these documents. Firstly, there is no means for providing a user with a shower experience equal to that of a conventional shower. Furthermore, the shower described in SE469413 place a heavy burden of control and maintenance on the user and is not very user-friendly. The cabin in US2011225722 does not provide user-important options. In both US2011225722 and SE469413 there is no way of knowing if the device or system is operating in a satisfactory way. This leaves an unsolved issue of hygiene. Moreover, in US2011225722 the water is passed through a filtering means, preferably a grid filter or sieve. This leads to a potential problem with bacterial growth and recirculation of contaminated water as a result. Furthermore, SE469413 and US20110146800 disclose a water container under the drain in the shower cabin where the water that is to be recirculated is contained. The contained contaminated water implies the potential risk of bacterial growth and viral spreading along with odour and risk for place of residence for various pests. Neither the backwash function, disclosed in US20100237021, discloses any means for verifying the quality of the filter post backwashing. This also, as previously mentioned, indicates potential problems with bacterial growth and viral spreading along with odour and risk for place of residence for various pests. Furthermore, both US20110146800 and US20100237021 disclose an optional use of disinfectants. The use of substances with disinfecting qualities in these systems, indicate an increased risk for hypersensitivity and various allergies. Further, several of the known arrangements use optical detection with potential problems with bubbles during the detection. When the water is flowing in the system turbulence is known to occur which produce bubbles that make optical measurements more difficult. Yet another drawback is experienced when any of the previous inventions malfunctions. It can for example be malfunctions regarding the filter components or the pump system. The user is then left with no shower options.

One aim of the present invention is to provide a shower solution ensuring that the user receives an equally comfortable and non-complicated shower experience as in a conventional shower. Another aim of the present invention is to ensure the quality of said shower experience. Yet another aim of the present invention is to provide an economically and environmentally friendly option to existing shower alternatives.

SUMMARY OF THE INVENTION

The purpose above is achieved by a hybrid device allowing purification and either recycling of water or discarding of water, wherein said hybrid device comprises a recirculation loop, a filter system with a nano-filter, at least one filter quality sensor and at least one pre-filter positioned before the nano-filter in process terms, and wherein the hybrid device is arranged to redirect the water from recirculation to drainage when the at least one filter quality sensor indicates the need thereof.

Said hybrid device according to the present invention enables users to receive an equally comfortable shower experience as in a conventional shower. The present invention allows both wash and rinse actions, implying that the water may be purified and recirculated until the water passing the system is at a pre-determined maximum level of contaminants. Said hybrid device comprises at least one water quality sensor that indicates the need of drainage. In such a case, the hybrid device discards the contaminated water. Therefore, the hybrid device according to the present invention ensures a predecided quality of water for the user.

Said filter system of the hybrid device according to the present invention ensures a high quality of the water recycled. The present invention comprises a filter system with a nano-filter such as for instance an electropositive nano-ceramic filter, e.g. a nano alumina (fiber) filter and at least one filter quality sensor. According to one specific embodiment, the nano-filter is a nano alumina (aluminium oxide) filter. The use of a nano-filter, such as a nano alumina filter, also implies the use of greater flow rates and the clogging resistance is also greater than equivalent performing membrane filters. Water purification based on nanotechnology implies purification on a viral level. In one specific embodiment of the present invention the hybrid device comprises a nano alumina filter comprising aluminium hydroxide fibers. The fibers may e.g. be about 2 nanometer in diameter. They are highly electropositive. When dispersed in water they may retain electronegative particles. The nano-filter incorporated in the hybrid device according to the present invention filters bacteria and nano size particulates, such as viruses. According to the present invention, the nano-filter enables filtering of e.g. intestinal bacteria, such as *E. coli*, and intestinal/abdominal parasites, which is of importance in relation to purification of water and of course showering. Also other contaminants are of course filtered off by the nano-filter incorporated in the device according to the present invention. The filtering according to the present invention is also preferred in terms of removal of contaminants when being compared to other methods like the use of an UV filter or pasteurization where the contaminants are neutralized but not removed. These methods may give a harmless water, but the taste and smell may still be undesirable.

Furthermore, combining said nano-filter with at least one filter quality sensor in a filter system ensures that said filter system is running as expected and in an optimal manner.

Moreover, shower users have grown accustomed to showers with a high flow rate and combining said filter system in the present invention ensures said flow rate providing an equally comfortable shower experience as in a conventional shower. Moreover, other advantages according to the present invention are the high level of comfort and the high level of autonomy of the system, not being affected by other water usage in e.g. a household, for instance in relation to temperature fluctuations. The comfort according to the invention may for instance be based on different criteria, such as water flow and water pressure, the water quality, and the temperature as well as fluctuations thereof. Furthermore, the device system according to the present invention may also ensure a stabilized pressure/flow in e.g. a shower.

Furthermore, the present invention provides an option of a conventional shower experience, thereby being a hybrid device. This is one advantage with the present invention, if for example there is a malfunction, the user can still enjoy a shower. This provides the user with an economically, user- and environmentally friendly option to existing shower alternatives.

SPECIFIC EMBODIMENTS OF THE INVENTION

Figure 1:
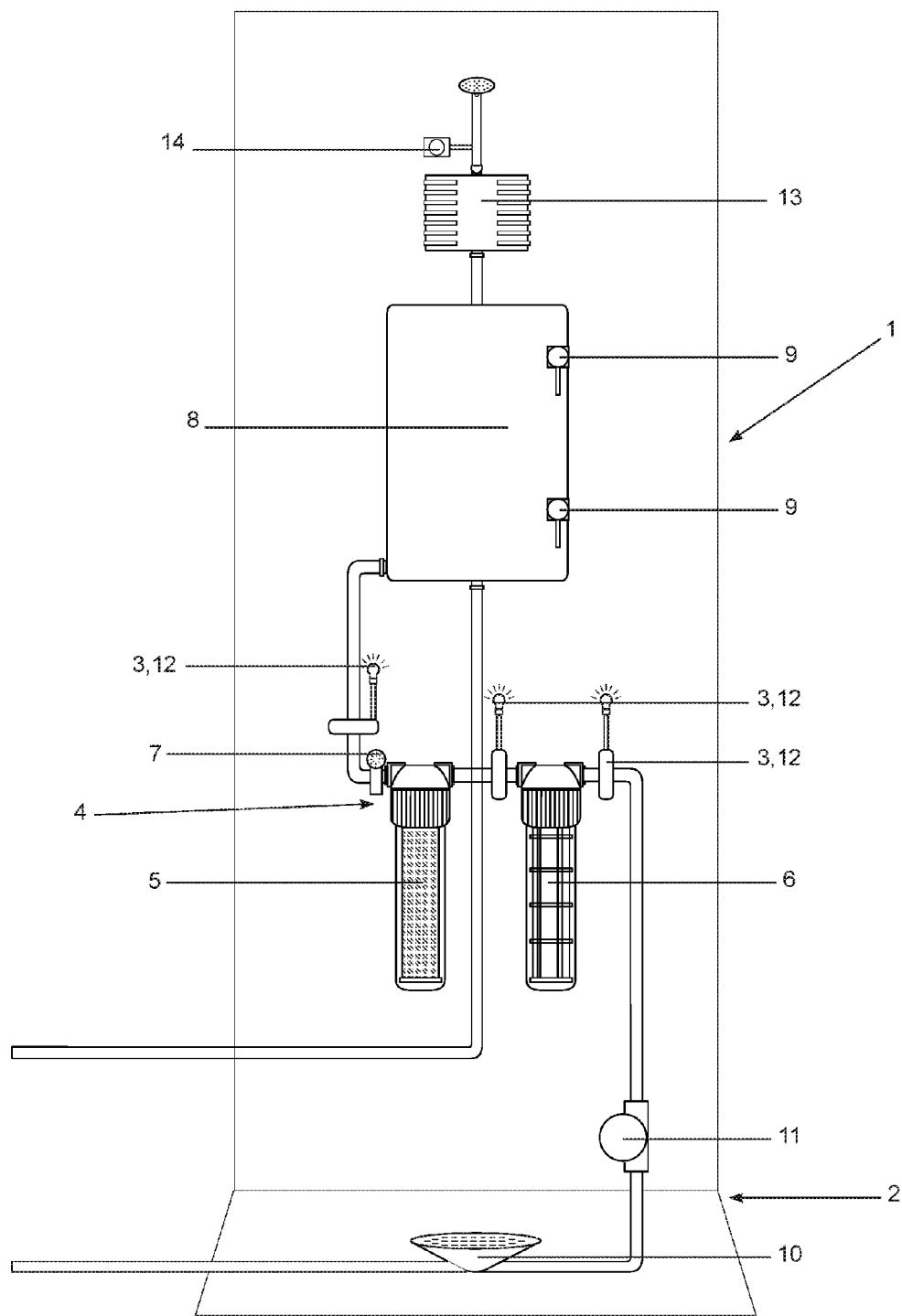
FIG. 1 shows one embodiment of the hybrid device according to the present invention.

Below, specific embodiments of the present invention are described. The present invention is a hybrid device since it provides the user both with a recirculation shower and with an ordinary shower. The wording ordinary shower indicates a system with incoming new water and allowing the same water to exit directly after use into the drainage system. Furthermore this hybrid device is automatically set to recirculation with drainage, when one of the indicators notifies the need to do so, but as a hybrid device is equipped with an option to set the system manually in ordinary shower mode. Another advantage with the recirculation mode according to the present invention is the high ensured level of clean water, even when being compared to regular shower water used today. For instance, contaminants like increased metal amounts, contaminants from fouling, depositions, bacteria like *legionella* bacteria, etc. are common in warm water piping used in many water systems for households. Such contaminants may be removed by the system according to the present invention. This may in fact also open up for the possibility of showering with an open mouth in countries where this is not suitable today.

According to one embodiment, the hybrid device according to the present invention comprises a recirculation loop, a filter system with a nano-filter and at least one filter quality sensor, and wherein the hybrid device is arranged to redirect the water from recirculation to drainage when the at least one filter quality sensor indicates the need thereof. Said filter quality sensor may be a pressure meter, a pressure switch or a flow meter but it can also comprise a combination of both. In one specific embodiment of the present invention, said filter quality sensor may be an advanced flow meter, and in another specific embodiment of the present invention, said filter quality sensor may be a digital pressure meter, but also other kinds of similar means are possible. When said at least one filter quality sensor is embodied as a pressure meter, a pressure drop indicates an initially full filter. Said filter is still performing purification at a pre-determined level, but this is an early indication that a replacement of said filter needs to take place. Further, when said at least one filter quality sensor is embodied as a flow meter, a decreased flow indicates, as mentioned above, that a replacement of said filter needs to take place. In one embodiment of the present invention, said at least one filter quality sensor is positioned before the pre-filter, in process terms. In process terms implies that the water passes said filter quality sensor before it passes the pre-filter. In another embodiment said at least one filter quality sensor is positioned after the pre-filter and before the nano-filter, in process terms. In yet another embodiment of the present invention, said at least one filter quality sensor, is positioned after the nano-filter in process terms. One advantage, of an indication from at last one filter quality sensor, is reassurance that the system is operating as desired. Another advantage, of said at least one filter quality sensor, is a lengthened lifetime of said filter system.

Said nano-filter in the present invention utilizes electron adsorption as means for purification, and the electropositive fibers adsorbs various sorts of particles, such as silica, metals, bacteria and virus, but also other sorts of particles. One advantage in the present invention, in comparison with SE469413 or US2011225722, is the ability to purify water at a viral level. US2011225722 implies a filtration of large particles, and SE469413 implies a filtration of large particles and bacteria. Neither US2011225722 nor SE469413 discloses prevention of spreading of virus.

Another embodiment of the present invention comprises more than one nano-filter coupled in series or parallel. Further, an attempt to replace existing filters in existing showers, with a nano-filter, would not be enough to achieve the present invention.

According to another embodiment, the hybrid device according to the present invention comprises at least one pre-filter, positioned before the nano-filter in, process terms. Standard filters may be used for this step, such as e.g. activated carbon filters, UV-filters, nylon filters or yarn-wound filters, but also other kinds of similar means are possible, such as e.g. ion exchange technique, comprising a back flush option to decrease the need for deliming.

It is important to understand that any type of filter technique may be possible to use in the pre-filter according to the present invention, and only examples are disclosed above. For instance, besides the ones disclosed above, also a wide-meshed filter, such as a mechanical filter, only filtering off very large particles may be used as the pre-filter. As said, many other types are also possible.

The use of different filters often implies different intended purposes. This may for example be to remove larger particles, such as hair and sand or smaller contaminants, such as humus, chlorine or bacteria, but is not restricted to these examples exclusively. Different contaminants set different requirements on selected filter. One advantage, with at least one pre-filter, is a lengthened lifetime of the often more expensive nano-filter. Another advantage is the option to adjust the hybrid device to current water quality. Different soil type means different water quality, and thereby different requirements set on the hybrid device. The present invention, installed in regions with high levels of lime water and calcareous water, may require a wetting filter while a hybrid device installed at places where the water is soft, may not need said filter. Further, said hybrid device, installed in a private facility may only require a filter separating from sand and hair, and then a yarn wound filter may be sufficient. If for example the present invention is installed in a place where there is an issue with hummus, an active carbon filter may be the optimal choice.

As mentioned above, there are different filters that may be used in the present invention. In one embodiment of the present invention, a combination of different filters may be used. These filters may be housed in one or more filter housing(s). One advantage, with said filter housing(s), is an option of containing different types of pre-filters and combining said pre-filters. This may, as hinted above, allow the present invention to be optimized, according to requirements set by the existing water type, at the intended location of where the hybrid device is to be installed.

In yet another embodiment of the present invention, said filter housing(s) can be modified. Said modified filter housing(s) may consist of a built in flow meter that is replaced along with said filter, when said filter quality sensor indicates the need thereof. One advantage is the option of continuous development and optimization of said filter type by the shower manufacturer. Another advantage is facilitating filter exchange. Neither SE469413 nor US2011225722 discloses anything that may facilitate maintenance. Filter housings of today imply that a skilled person need to perform the replacement of filters, but said filter housing(s) according to the present invention, with a built in flow meter, implies a design that allows facilitated filter replacement. One embodiment of said filter housing(s), with a built in flow meter, may allow a filter replacement through a two step button push.

In another embodiment of the present invention, said hybrid device comprises a water container. The water quality is further ensured by said water container only containing pure water. This is different in comparison to the solution disclosed in SE469413, where contaminated rinse water is kept in the container. Said water container according to the present invention, holding clean water, prevents issues with bacterial growth, spreading of virus and provides a low maintenance. Further, said water container comprises a level sensor that indicates a low level of water and a level sensor that indicates a high level of water, and wherein the hybrid device is arranged to allow new water to flow in to said water container, when the level sensor indicates the need thereof. This further ensures a steady flow within the system.

In one specific embodiment of the present invention, the water container may be about 10 L, but containers in the range of 8-30 L, dependent upon the intended use, may be of interest. Also smaller water containers, even below 2-3 L and even down to 0.5 L, and larger water containers may be possible according to the present invention. In for example a submarine, where a large group is to use the same shower, a larger container may be preferred and continuous showering applied.

In one embodiment of the present invention, said hybrid device comprises a flow through water heater. This is different from SE469413, which discloses a heat coil. A heat coil may be suitable for small volumes of water and low flow rates, but may pose a problem today, when a comfortable shower require a flow rate of 9-20 l/min for approximately 6-8 minutes. The present invention utilizes, in one embodiment, a flow through heater in combination with a water container, which ensures required flow rate and a pleasant temperature. In one specific embodiment of the present invention, the flow through water heater has a power of about 6.5 kW and a water container volume of about 10 L.

It should be noted that the heating system of the present invention may embody different units and be of different type. For instance, a heating coil such as above is possible, but a heat exchanger or a system thereof, is another possible alternative. Other possible examples are heating with electric heater like a heating cartridge, and heat exchanging by the use of tap hot water. The latter alternative may be beneficial as there is no need for e.g. an extra power supply, however the water consumption and also the energy consumption may be high. Another possible example is heating with other types of media, such as e.g. liquefied petroleum gas (LPG). Moreover, the regulation of the heating system may vary, e.g. an ordinary thermostat or several such temperature regulator units may be incorporated.

In yet another specific embodiment of the present invention, a mixer tap in contact with the water inlet may be used. This indicates further cost efficiency if a household for example has both warm and cold fresh water piping. Further, said mixing tap may reduce the size of the hybrid device.

One advantage with the present invention is that it can be installed in different places. In one embodiment of the present invention, said hybrid device may be installed in a shower cabin. In another embodiment of the present invention, said hybrid device may be connected to the regular water pipes in a house, and built in to the wall and/or floor. In yet another embodiment of the present invention, said hybrid device may be partially built in to the wall and/or floor. One advantage of said hybrid device is the option of adjusting size to fit various places. In one embodiment of the present invention, it is installed in a submarine and in another embodiment it is installed at a sports ground. At public places expensive parts may be advised to keep unexposed. In relation to this advantage of the present invention it may be mentioned that the showers described in US2011225722 and SE469413 both are limited to cabin solutions. As such they are limited to more or less traditional household usage, and are not suitable for installation in e.g. a submarine. The present invention, however, is a hybrid device which may find use in very different environments. Different examples are e.g. the traditional household installation, in possible module systems or in submarines as disclosed above. There are also very different possible system or module types where the hybrid device according to the present invention may be incorporated. One example is in a combined system with a shower (hybrid device) and bath tub, where clean water may be reused in a very economical way. In such a system, special valves and nozzles may have to be installed in the system. Another possible different use is as a standalone solution, with or without a cabin, where the hybrid shower device is coupled to an external energy (heating) source and possibly also an external water container. The latter solution may be an effective embodiment of the present invention for use in e.g. developing countries.

As mentioned above, the present invention may comprise a flow meter. One advantage of said flow meter is ensuring a steady flow; this may indicate filter condition, and this in turn may indicate the purity of the water. Further, in one embodiment of the present invention the flow is 9-20 L/min; in another specific embodiment of the present invention, the flow is about 15 L/min. Another advantage with the present invention, is receiving information from the flow meter. This information provides an indication about the amount of semi-contaminated water required to finish said nano-filter.

In one specific embodiment of the present invention, said hybrid device comprises at least one water quality sensor. Said sensor may be positioned in contact with said filter system, but also other positions within the system may be of interest. Said water quality sensor may be a TOC sensor (Total Organic Carbon), a biosensor, a pH meter (measuring acidity or alkalinity) or an optical sensor, but also other kinds of similar means are possible. In one specific embodiment of the present invention the water quality sensor is an conductive sensor, such as an electrical conductive sensor.

In one embodiment of the present invention, said hybrid device comprises a modified drain. Said modified drain collects the water used and facilitates the stream of water towards the recycling loop and filter system or towards drainage. In one specific embodiment of the present invention, said modified drain comprises at least one sensor, indicating the water quality, as mentioned above, and wherein the hybrid device is arranged to redirect the water from recirculation to drainage when the at least one water quality sensor indicates the need thereof. Said water quality sensor may be a TOC sensor (Total Organic Carbon), a biosensor, a pH meter (measuring acidity or alkalinity) or an optical sensor, but also other kinds of similar means are possible. In yet another embodiment of the present invention, said nano-filter comprises at least one sensor indicating the water quality. One advantage of said water quality sensor is ensuring the user of a pre determined water quality. In one specific example, a user that has concerns or actual information of a poor water quality, may allow all water to pass through the hybrid device according to the present invention one round, before using the water. Furthermore in one specific embodiment relating to the present statement, the design may be a filter system placed before the water container, in process terms. The present invention is described as a shower concept but the hybrid device is to be seen as possible unit to incorporate in various equipment such as a sink, a toilet, a bathtub, a dishwasher, a washing machine, but not exclusively. Also other methods of application are thinkable. One specific embodiment is incorporating the device according to present invention close to the water inlet in a house. In this case, as is the case for also many other applications, the interaction between the filter quality sensor and a water quality sensor is important. The filter sensor according to the present invention ensures a satisfactory operation of the filter system, and the water quality sensor acts as a protector of the filter system so that the filter system is not subjected to a too contaminated water mixture.

In the present invention, when any of said sensors is indicating an issue, the hybrid device notifies the user and the system is redirected from recirculation to drainage. Dependant on the embodiment, the system notifies where there is an issue in process terms. The system informs the user if it is for example the pre-filter, the nano-filter or the recirculation pump that needs to be examined.

According to the present invention, said hybrid device comprises a recirculation loop. Said recirculation loop facilitates recirculation of water within the system. In its simplest design, said recirculation loop may be said to constitute only piping/tubing. The design may vary and the ability to recirculate water is the key feature of the recirculation loop according to the present invention. According to one embodiment of the present invention, said recirculation loop comprises at least one recirculation pump. Said recirculation pump may be a two component pump, but other pumps are possible. In another embodiment, said recirculation loop comprises two recirculation pumps. One said recirculation pump, facilitates collecting water via said modified drain. The other said recirculation pump facilitates pressure management of water flow near said water reservoir.

Furthermore, it should be noted that the water reservoir according to the present invention may function as a buffer tank. Such a buffer tank may act as a pressure equalizer or damper for the hybrid device system so that pressure may be held reasonably constant in the entire system.

One advantage of the present invention is the option of bypassing the recirculation mode allowing all water to be drained. This provides the user with a conventional shower experience. This may be useful if the hybrid device is intended for several users, and a few of the users have little faith in technology, or the system is temporarily malfunctioning. Either way the user is not left without a shower option. Further, if the user is waiting for a service technician to repair, or exchange any part, the user is not left without a shower option. The present invention provides the user with an economically, user- and environmentally friendly option to existing shower alternatives.

DETAILED DESCRIPTION OF THE DRAWINGS

FIG. 1 shows one embodiment of the hybrid device 1 according to the present invention. According to this specific embodiment, the hybrid device 1 comprises a recirculation loop 2, at least one filter quality sensor 3, a filter system 4, nano-filter 5, pre-filter 6, flow meter 7, water reservoir 8, level sensor 9, modified drain 10, circulation pump 11, at least one water quality sensor 12, and a flow through water heater 13. A possible temperature gauge 14 is also shown.

Figure 2:
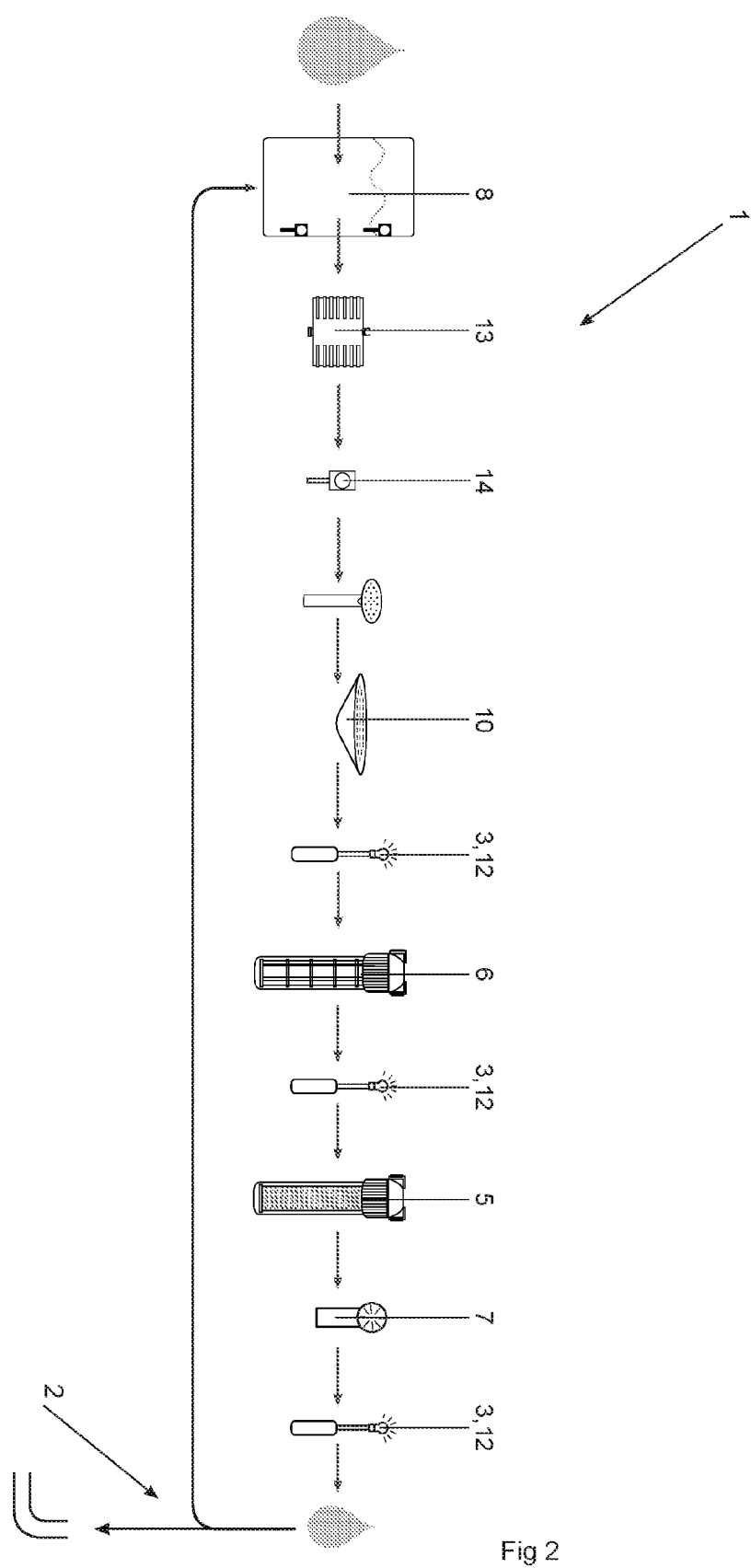
FIG. 2 shows one example of a flow chart for the shower concept of the present invention.

FIG. 2 shows one example of a flow chart of the present invention. According to this example, the flow chart comprises: a hybrid device 1, a recirculation loop 2, at least one filter quality sensor 3, nano-filter 5, pre-filter 6, flow meter 7, water reservoir 8, modified drain 10, at least one water quality sensor 12, flow through water heater 13. A possible temperature gauge 14 is also shown.

It should be noted that the hybrid device according to the present invention of course may comprise different standard components, also having varied design, which are not explicitly mentioned. Examples of such are one or more shower nozzles, different kinds of tubing, valves, etc. etc. Moreover, the design of the hybrid device may vary, and the present invention, as formulated in claim 1, should be seen as embodying different forms of the device.

The invention claimed is:

1. A hybrid device, which is a shower that is adapted to function both as a recirculation shower and as an ordinary shower allowing purification and either recycling of water or discarding of water, wherein said hybrid device comprises:

a recirculation loop,
a filter system with a nano-filter,
at least one filter quality sensor,
at least one water quality sensor,
a circulation pump, and
a modified drain configured to collect the water, and with the aid of the circulation pump, recycles rinsing water via the recirculation loop or discards water with high amounts of contaminants,
wherein the nano-filter is disposed in a filter housing that includes a built in flow meter configured to be replaced along with the nano-filter when the filter quality sensor indicates the need thereof, and wherein the hybrid device is arranged to redirect the water from the recirculation loop to drainage to be discarded from the hybrid device when the at least one water quality sensor indicates that the water is contaminated above a pre-determined maximum level of contaminants.

2. The hybrid device according to claim 1, wherein the at least one pre-filter is positioned before the nano-filter.

3. The hybrid device according to claim 2, wherein the at least one filter quality sensor is positioned before the at least one pre-filter.

4. The hybrid device according to claim 1, wherein the at least one filter quality sensor is positioned after the nano-filter.

5. The hybrid device according to claim 1, said hybrid device also comprising a water reservoir connected to the recirculation loop.

6. The hybrid device according to claim 5, said hybrid device also comprising at least one level sensor within said water reservoir.

7. The hybrid device according to claim 6, said hybrid device also comprising two level sensors within said water reservoir.

8. The hybrid device according to claim 1, wherein said at least one water quality sensor is an electrical conductive sensor.

9. The hybrid device according to claim 1, wherein the at least one water quality sensor is connected to the nano-filter.

10. The hybrid device according to claim 1, said hybrid device comprising a flow through water heater.

11. A method, wherein water is purified and either recycled or discarded using a hybrid device that is a shower that is adapted to function both as a recirculation shower and as an ordinary shower, said hybrid device comprises:
a recirculation loop,
a filter system with a nano-filter,
at least one filter quality sensor,
at least one water quality sensor,
a circulation pump, and
a modified drain configured to collect the water, and with the aid of the circulation pump, recycles rinsing water via the recirculation loop or discards water with high amounts of contaminants,
wherein the nano-filter is disposed in a filter housing that includes a built in flow meter configured to be replaced along with the nano-filter when the filter quality sensor indicates the need thereof, and the hybrid device is arranged to redirect the water from the recirculation loop to drainage to be discarded from the hybrid device when the at least one water quality sensor indicates that the water is contaminated above a pre-determined maximum level of contaminants.

12. The method according to claim 11, wherein at least one pre-filter is positioned before the nano-filter.

13. A method according to claim 11, wherein the method involves a water flow of at least 9 l/min after the nano-filter during normal operation.

* * * * *